… … …

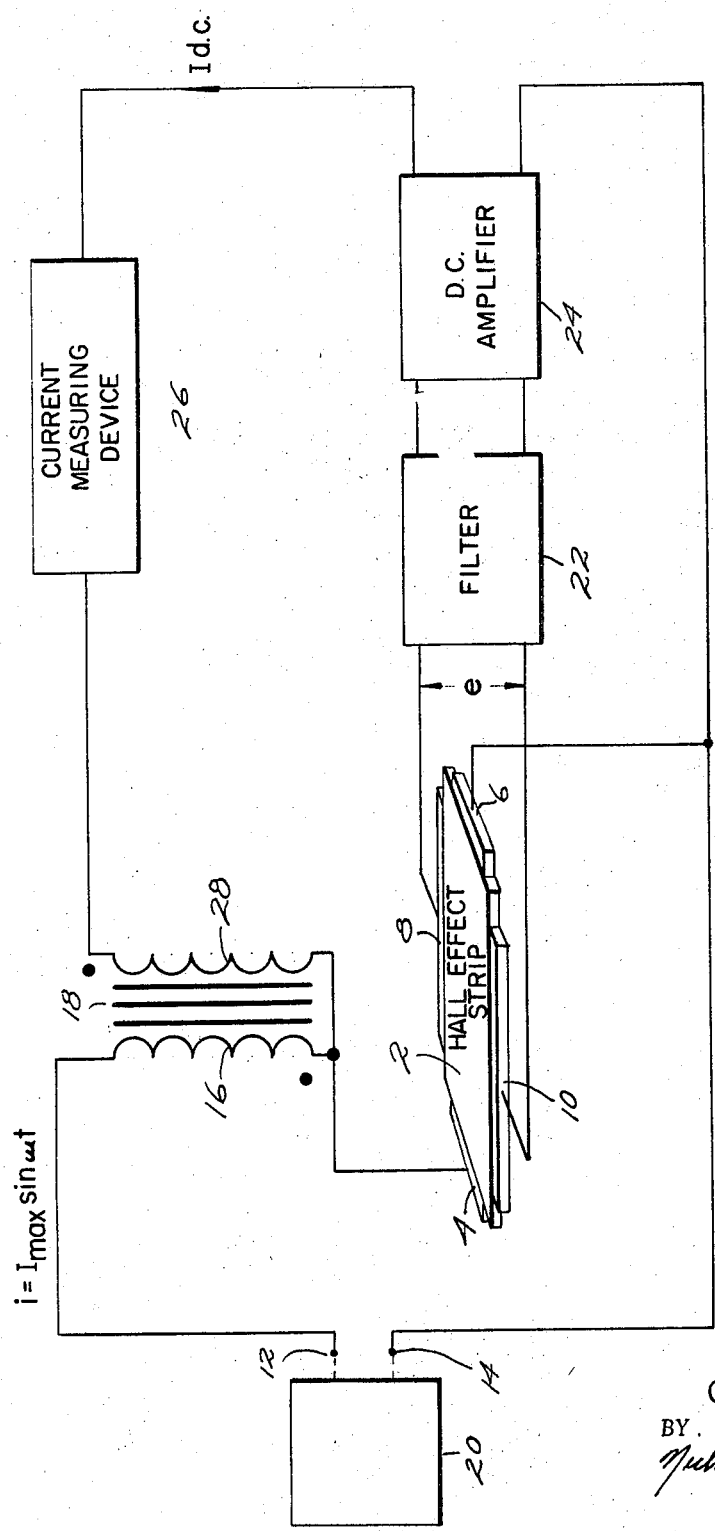

United States Patent Office 3,422,351
Patented Jan. 14, 1969

3,422,351
HALL-EFFECT INSTRUMENT FOR MEASURING THE RMS VALUE OF AN A.C. SIGNAL
George E. Pihl, Abington, Mass., assignor to Miniature Electronic Components Corp., Holbrook, Mass., a corporation of Massachusetts
Filed Aug. 11, 1964, Ser. No. 388,756
U.S. Cl. 324—117          21 Claims
Int. Cl. G01r *33/00*

ABSTRACT OF THE DISCLOSURE

A device embodying a Hall-effect strip for converting the true RMS value of an input A.C. electrical signal to an equivalent D.C. signal. The input A.C. signal to be measured provides the control current for the Hall-effect strip and also is used to generate the control field, whereby the resulting Hall-effect voltage has a D.C. component proportional to the mean squared value of the input signal. This D.C. component is amplified and applied to a feedback loop that produces a Hall-effect voltage opposite in polarity to the D.C. component of the Hall voltage produced by the A.C. input signal, with the difference between the two constituting an error signal which can be made vanishingly small as the loop gain is increased. The current in the feedback loop provides a measure of the true RMS value of the A.C. input signal.

---

This invention relates to electrical instruments and more particularly to a system for converting the RMS value of a complex A.C. electrical signal to an equivalent D.C. signal.

The primary object of the present invention is to provide a device for converting the true RMS value of an input A.C. electrical signal to obtain an equivalent D.C. signal, regardless of the complexity of the input waveform.

A more specific object of the present invention is to provide an RMS meter which embodies and is based upon a Hall-effect generator.

Another object is to provide a system for measuring the effective or true RMS value of a complex waveform A.C. signal which does not involve measurement of peak value, heating effect, or the use of a bridge circuit.

A further object of the invention is to provide an RMS meter which has fast and accurate response and which can be used to determine the effective value of small peak amplitude signals as well as signals which have high frequency harmonics.

Other objects and many of the attendant advantages of the present invention will become more readily apparent from the following detailed specification when considered together with the accompanying drawing which illustrates a preferred embodiment of the invention.

According to the invention, the illustrated RMS meter utilizes the property of certain semiconductor materials, e.g., indium antimonide, to provide an electric potential, known as the "Hall Voltage," between laterally spaced electrodes along one axis of a strip of such material wherein a control current is flowing between two electrodes along a second transverse axis while the plane of the strip is perpendicular to a magnetic field. The output voltage of a Hall-effect device is generally proportional to the product of the current passing through the strip and the magnetic field strength in the direction perpendicular to the strip. The absolute magnitude of the Hall-effect voltage for a given field strength and a given input current is dependent upon the composition and dimensions of the strip. For the purposes of this specification, the term "Hall-Effect Strip" denotes a plate characterized by a Hall-effect coefficient having a pair of spaced input electrodes connected to supply current through the plate between the input electrodes, plus a pair of output electrodes connected to the plate on opposite sides of the input current path. The applied magnetic field and the input plate current may be designated "control field" and "control current," respectively.

It is known that the polarity of the Hall voltage will remain unchanged if the directions of both the control field and control current are not changed. However, if the control field is reversed while the control current direction remains the same, the Hall voltage will change polarity. The same result occurs if the control current direction is reversed while the control field remains the same. For the same reasons, reversing the direction of the control field and control current simultaneously will produce no polarity change in the output Hall voltage.

The present invention is based on recognition of the following facts: (a) the control current may be employed to generate the control field; (b) when the control current is used to produce the control field, the polarity of the output Hall voltage will remain constant even if the control current is an alternating current and reverses direction; (c) where the control field is produced by the control current, the magnitude of the Hall voltage will vary with the magnitude of the control current and the control field, that is, the magnitude of the Hall voltage will be proportional to the product of the current multiplied by itself. In connection with the relationship between the Hall voltage and the square of the control current, it is to be noted that the Hall voltage will have a frequency twice that of the control current when the latter is used to produce the control field. Doubling of frequency is a characteristic difference between the two waveforms produced by plotting the instantaneous values of a periodically varying A.C. current and the corresponding values of the current squared. The fact that the Hall voltage will have twice the frequency of the control current is demonstrated by plotting the instantaneous values of a sinusoidally varying A.C. control current that is used to produce the control field, and also plotting the corresponding values of the resulting Hall voltage. Because the Hall voltage will not change polarity, it will have a positive excursion starting at zero and returning to zero during a positive swing of the control current, and then repeat the same positive excursion during the negative swing of the control current. Hence, while the control current completes one full cycle relative to the zero axis, the Hall voltage will complete two positive excursions each starting and ending with zero. However, it also can be seen that this same Hall voltage is itself a sinusoidally varying signal, but varying about an axis displaced from the zero axis of the control current. In effect, then, the resulting Hall voltage will comprise a steady-state D.C. component and an A.C. component varying about the steady-state level. As indicated previously, where the control field is produced by the control current, the Hall voltage is proportional to the product of the current multiplied by itself. In other words, $$e = Ki^2 \tag{1}$$

where $e$ is the Hall voltage, K is a constant, and $i$ is the alternating control current. From Equation 1, it follows that $$e = K(I_m \sin \omega t)^2 \tag{2}$$

where $I_m$ is the maximum or peak value of the A.C. current, $\omega$ is the angular velocity in radians/sec., and $t$ is the time in seconds. From Equation 2 it can be shown that $$e = KI_m^2(\tfrac{1}{2} - \tfrac{1}{2}\cos 2\omega t) \quad (3)$$

In Equation 3, the term $KI_m^2$ represents the steady-state or D.C. component of the A.C. signal, while the term $KI_m^2(\tfrac{1}{2}\cos 2\omega t)$ represents the A.C. component. In other words, the D.C. component of the Hall voltage (represented hereafter as $e_{D.C.}$) is equal to $KI_m^2/2$ or proportional to the mean squared value of the input current. The present invention contemplates that by integration or filtering it is possible to recover this D.C. component to provide a measurement of the square root of the mean squared value of the input current, i.e., the RMS or effective value of the input current. The system shown in the single figure of the drawing illustrates how this may be achieved.

Turning now to the drawing in detail, the system embodies a rectangular Hall-effect strip 2 having a first pair of input electrodes 4 and 6 secured to opposite side edges thereof and a second pair of output electrodes 8 and 10 mounted at its other two opposite side edges. Electrodes 4 and 6 are connected in series with a pair of input terminals 12 and 14, respectively, with electrode 4 connected to input terminal 12 by way of a coil 16 wound in a predetermined direction about a permeable iron core 18. Terminals 12 and 14 are used to connect the system to the source of the alternating current to be measured, represented at 20. Coil 16 and core 18 are disposed so that the magnetic field generated by the coil when it is energized will be at right angles to the plane of the Hall-effect strip. With the foregoing arrangement wherein the control current and the field current for the Hall-effect strip are one and the same, a Hall-effect voltage will be developed across electrodes 8 and 10. This voltage will vary in amplitude with the input current but will have a constant polarity which is determined by the composition of the Hall-effect strip. As indicated previously, this Hall-effect voltage will have a D.C. component and various A.C. components, depending upon the complexity of the A.C. signal.

The output electrodes are connected to a filter 22 which in turn is coupled to a high gain D.C. chopper amplifier 24. One of the output terminals of D.C. amplifier 24 is connected to input electrode 6. The other output terminal is connected to input electrode 4 by way of a current measuring device 26 and a second coil 28. Preferably, but not necessarily, coil 28 is wound on the same core as coil 16. It is essential that coil 28 be wound opposite to coil 16 with its field also at right angles to the Hall-effect strip and that it have the same flux-producing capability as coil 16 for equal currents. The filter 22 may be of a variety of conventional designs provided that it remove the A.C. components of the Hall voltage. Thus, only the D.C. component of the Hall voltage is supplied to amplifier 24 which amplifies it to produce a direct current $I_{D.C.}$. This direct current may be represented as follows:

$$I_{D.C.} = A e_{D.C.} \quad (4)$$

where $e_{D.C.}$ represents the D.C. component of the Hall voltage and A is the transfer function of the filter and amplifier. Because of the arrangement of the feedback network, the current $I_{D.C.}$ fed back through the coil 28 and strip 2 produces a D.C. voltage in opposition to the D.C. component $e_{D.C.}$ of the Hall voltage produced by the A.C. input. Accordingly, a feedback loop exists where $e_{D.C.}$ becomes an error signal which can be made vanishingly small as the loop gain is increased. The current $I_{D.C.}$ provides a measure of the true RMS value of the A.C. input signal. This is demonstrated by the following mathematics:

Since $I_{D.C.} = A e_{D.C.}$ and $$e_{D.C.} = K\left(\frac{I_m^2}{2} - I^2_{D.C.}\right)$$

it can be concluded that $$I_{D.C.} = AK = \left(\frac{I_m^2}{2} - I^2_{D.C.}\right)$$

$$I^2_{D.C.}AK + I_{D.C.} - AK\frac{I_m^2}{2} = 0$$

$$I_{D.C.} = -1 \pm \frac{\sqrt{1 + 4A^2K^2\frac{I_m^2}{2}}}{2AK}$$

If $$\frac{4A^2K^2I_m^2}{2} \gg 1 \text{(high gain)}$$

then $$I_{D.C.} = \frac{AKI_m}{\sqrt{2}AK} = I_{RMS}$$

Therefore, $I_{D.C.}$ becomes a measure of the true RMS value of the A.C. input signal.

As a further refinement, the current through both coils, the total current through the strip, or both, could be modulated at a fixed high-frequency rate, thus producing an error signal $e$ having the high frequency component which could be filtered out and used to drive a fixed frequency amplifier and rectifier to produce D.C. in the feedback path. In other words, the system could be used as its own chopper rather than utilizing the high-gain D.C. amplifier which itself incorporates a chopper. It also is contemplated that the filter 22 could be replaced by an integrator and that the input to the D.C. amplifier would be the D.C. component of $e$ determined by integration.

It is to be observed also that although the preferred embodiment is described for current measurement, the system is equally valid for voltage measurement providing the A.C. and D.C. impedances are identical. Thus, for example, to measure an A.C. voltage applied across terminals 12 and 14, the illustrated system could be modified by connecting a resistor R1 between terminal 12 and coil 16. The value of resistor R1 would be such as to assure that the control current through it would be in phase with the input voltage. At the same time, a second resistor R2 equal to R1 would be inserted between the current measuring device 26 and coil 28, while the D.C. amplifier 24 would be replaced by a D.C. voltage amplifier. Having R2 equal R1 assures that the output of the voltage amplifier will produce a current proportional to the input voltage applied at terminals 12 and 14. The current measuring device would be calibrated to indicate RMS voltage values directly or it could be used to drive a separate voltmeter.

It is to be understood that the invention is not limited in its application to the details of construction and arrangement of parts specifically described or illustrated, and that within the scope of the appended claims, it may be practiced otherwise than as specifically described or illustrated.

I claim:

1. An RMS meter comprising a Hall-effect strip and a first coil disposed to create a magnetic field whose general direction is at right angles to the plane of said strip; means for passing an A.C. signal through said strip and said coil in series whereby to develop a first Hall-effect voltage; means for extracting from said first Hall voltage its D.C. component; a feedback loop comprising means for amplifying said D.C. component and deriving therefrom a proportional D.C. current, a second coil, means for passing said D.C. current through said second coil and said strip to create a D.C. Hall-effect voltage opposite to said D.C. component, whereby the difference between said opposite D.C. Hall-effect voltage and said D.C. component of Hall-effect voltage becomes an error signal which can be made vanishingly small as the loop gain is increased, and means for measuring the magnitude of said D.C. current and providing therefrom an output indicative of the true RMS value of said signal.

2. In an RMS meter, the combination comprising a Hall-effect strip having a pair of opposed input electrodes and a pair of opposed output electrodes, a first coil connected at one end of said input electrodes, means for passing an alternating current through said Hall-effect strip by way of said input electrodes and said first coil, said first coil disposed so that the lines of force of the magnetic field generated thereby in response to said alternating current will extend in a direction substantially normal to the plane of said strip, a second coil wound opposite to said first coil, said second coil also disposed so that when it is energized the lines of force of its resulting magnetic field will extend in a direction substantially normal to said first coil, means for deriving a resultant Hall-effect product voltage from said strip, means for amplifying the D.C. component of said Hall-effect product voltage and deriving therefrom a D.C. current, and means for applying said D.C. current as a feedback to said Hall-effect strip via said second coil and said input terminals to produce a D.C. Hall-effect product voltage opposite in polarity to said D.C. component.

3. Apparatus comprising a first means for generating a first magnetic field, a Hall-effect strip disposed with its plane extending at right angles to the lines of force of said first magnetic field, means for applying an input A.C. signal to said first means and to said strip, means for deriving a Hall-effect output voltage in response to said application of said input A.C. signal to said first means and said strip, means including an amplifier for deriving from said Hall-effect output voltage a D.C. signal whose amplitude is proportional to the D.C. component of said Hall-effect output voltage, and a feedback loop, said loop comprising second means for generating a second magnetic field opposite in polarity to said first magnetic field, means for applying said D.C. signal to said second means and also to said strip to produce a D.C. Hall-effect voltage which nulls said D.C. component, and means for measuring said D.C. signal.

4. Apparatus comprising a Hall-effect strip, first signal responsive means for producing a first magnetic field at right angles to the plane of said strip, second signal responsive means for producing a second magnetic field opposite to said first field, means for applying an A.C. signal to be measured to said strip and said first means in series, means for deriving a Hall-effect voltage from said strip, means for deriving from said Hall-effect voltage a D.C. current having an amplitude proportional to the D.C. component of said Hall-effect voltage, means for passing said D.C. current through said second means and said strip so as to produce a D.C. Hall-effect voltage which nulls said D.C. component, and means for measuring the amplitude of said D.C. current.

5. Apparatus comprising a Hall-effect generator including a Hall-effect strip having a pair of control current electrodes and a pair of output electrodes, first means for generating a first magnetic field, means for applying an A.C. input signal to said first means and said control current electrodes, means for amplifying the D.C. component of the Hall voltage developed at said output electrodes and producing a D.C. current proportional in amplitude to said D.C. component, second means for generating a second magnetic field opposite in polarity to said first magnetic field, means for applying said D.C. current to said second means and said control current electrodes, and means for providing an output proportional to the magnitude of said D.C. current.

6. Apparatus as defined by claim 5 wherein said first and second means comprise first and second oppositely wound coils.

7. Apparatus as defined by claim 6 wherein said first and second coils are wound on a common core.

8. Apparatus for determining the RMS value of an alternating signal comprising first means including a first coil and a Hall-effect strip for producing in response to said signal an A.C. voltage having a D.C. component proportional in amplitude to the mean squared value of said alternating signal, second means comprising a second coil and said Hall-effect strip for producing in response to a D.C. current a D.C. voltage which opposes said D.C. component to yield a difference D.C. voltage, means for producing a D.C. current proportional to said difference D.C. voltage, means for applying said D.C. current to said second means, and means for providing an indication of the magnitude of said D.C. current.

9. Apparatus as defined by claim 8 wherein said first and second coils produce first and second control fields respectively of opposite polarity.

10. Apparatus as defined by claim 9 wherein said first and second coils are oppositely wound.

11. Apparatus as defined by claim 8 wherein said two coils are wound on a common core.

12. Apparatus as defined by claim 8 wherein said alternating signal is an alternating current.

13. Apparatus as defined by claim 8 wherein said alternating signal is an alternating voltage.

14. A device for determining the RMS value of an A.C. signal comprising in combination, a Hall-effect strip, a core, a first winding on said core adapted when energized to induce in said core a control field that extends through said strip in a direction substantially normal to the plane thereof, said first winding being connected in series circuit relation with said strip, a second winding on said core adapted when energized to induce a magnetic field in said core that extends through said strip in a direction substantially normal to the plane thereof, a pair of input terminals to which an A.C. signal to be measured may be applied, said terminals connected to said first winding and said strip so that an A.C. signal applied thereto will pass through said strip and said first winding so as to induce said control field, means connected to said strip for extracting substantially only the D.C. component of the resultant Hall output of said strip generated by the passage of said A.C. signal therethrough in the presence of said controlled field, means for providing a D.C. current proportional to said D.C. component, means for passing said D.C. current through said second winding and said strip so as to null said D.C. component of said output, and means for measuring the magnitude of said D.C. current.

15. A device as defined by claim 14 wherein said Hall-effect strip has two input electrodes at opposite edges thereof, and further wherein said first winding is connected between one of said input electrodes and one of said input terminals and the other input terminal is connected to the other of said input electrodes.

16. A device as defined by claim 14 wherein said second winding is connected to said one input electrode.

17. A device as defined by claim 16 wherein said second winding is wound opposite to said first winding.

18. A device for determining the RMS value of an A.C. signal comprising in combination, a Hall-effect strip having first and second opposed input electrodes and first and second opposed output electrodes at the periphery thereof, said input electrodes being in approximately quadrature relation to said output electrodes, first and second coils, first and second input terminals, means connecting said first coil between said first input terminal and said first input electrode, means connecting said second input terminal to said second input electrode, a core around which said coils are oppositely wound, said core and coils arranged so that energization of each coil induces in said core a magnetic field that extends through said strip in a direction substantially normal to the plane thereof, means including an amplifier connected to said output electrodes for producing an output D.C. current proportional to the D.C. component of the Hall-effect voltage produced at said output electrodes by an A.C. signal applied to said input terminals, means connecting one end of said second coil to said first input electrode, and means connecting the opposite end of said second coil and said amplifier providing a feedback circuit that passes said D.C. current through said Hall-effect strip so as to produce a D.C. Hall-effect voltage opposite in polarity to the D.C. component of the Hall-effect voltage produced at said output electrodes by said A.C. signal.

19. A device as defined by claim 18 wherein said amplifier is a D.C. amplifier, and further wherein said means connected to said output electrodes includes a filter adapted to filter out A.C. components of the Hall-effect voltage appearing at said output electrodes so that substantially only the D.C. component of said Hall-effect voltage is applied as an input to said amplifier.

20. A device as defined by claim 18 further including means for measuring the magnitude of said D.C. current.

21. A device as defined by claim 18 adapted to determine the RMS value of an alternating voltage, said device further comprising a first resistor connected between said first input terminal and said first coil and a second resistor connected in said feedback circuit, and further wherein said amplifier is a voltage amplifier.

References Cited

UNITED STATES PATENTS

| | | | |
|---|---|---|---|
| 2,131,580 | 9/1938 | Bjornson | 324—99 XR |
| 2,190,743 | 2/1940 | Vance | 324—123 XR |
| 2,928,048 | 3/1960 | Postal. | |
| 3,159,787 | 12/1964 | Sexton et al. | 324—123 XR |

FOREIGN PATENTS 1,020,414   12/1957   Germany.

RUDOLPH V. ROLINEC, *Primary Examiner.*

E. F. KARLSEN, *Assistant Examiner.*

U.S. Cl. X.R.

323—94; 324—45, 99